United States Patent
Li et al.

(10) Patent No.: US 12,468,389 B1
(45) Date of Patent: Nov. 11, 2025

(54) METHOD FOR OPERATING APPLICATION PROGRAM BASED ON SOMATOSENSORY

(71) Applicant: HOOROO NETWORK PTE. LTD., Singapore (SG)

(72) Inventors: Jun Li, Linxiang (CN); Chao Guo, Jiangxi Province (CN)

(73) Assignee: HOOROO NETWORK PTE. LTD., Singapore (SG)

( * ) Notice: Subject to any disclaimer, the term of this patent is extended or adjusted under 35 U.S.C. 154(b) by 0 days.

(21) Appl. No.: 19/006,647

(22) Filed: Dec. 31, 2024

(51) Int. Cl.
*G06F 3/01* (2006.01)

(52) U.S. Cl.
CPC .................................. *G06F 3/015* (2013.01)

(58) Field of Classification Search
CPC ........................................................ G06F 3/015
USPC ......................................................... 345/156
See application file for complete search history.

(56) References Cited

U.S. PATENT DOCUMENTS

| | | | |
|---|---|---|---|
| 11,402,871 B1* | 8/2022 | Berliner | G02B 27/017 |
| 2017/0293356 A1* | 10/2017 | Khaderi | A61B 3/113 |
| 2022/0301685 A1* | 9/2022 | Burwinkel | G09B 19/04 |
| 2022/0409110 A1* | 12/2022 | Rokhmanova | A61B 5/0024 |
| 2024/0138748 A1* | 5/2024 | Kim | A61B 5/378 |

* cited by examiner

*Primary Examiner* — Calvin C Ma
(74) *Attorney, Agent, or Firm* — Justin Lampel (57) ABSTRACT

The present invention discloses a method, device, equipment, and computer-readable storage medium for operating an application program based on somatosensory. The method includes: obtaining original sensor data of a motion sensor from the smart wearable device; calibrating a multi-dimensional coordinate system of the motion sensor to obtain a unified matrix of the sensor coordinate system after multi-dimensional calibration; preprocessing the original motion data through standardization to obtain a standardized sensor data stream; obtaining a motion feature vector from the standardized sensor data stream; The application program operation method based on somatosensory of the present invention has the advantage of converting the motion sensor data of the smart wearable device into a universal input event, thereby realizing cross-platform human-computer interaction.

10 Claims, 1 Drawing Sheet

METHOD FOR OPERATING APPLICATION PROGRAM BASED ON SOMATOSENSORY

TECHNICAL FIELD

The present invention relates to the technical field of somatosensory control, and in particular, to a method, device, equipment, and computer-readable storage medium for operating an application program based on somatosensory.

BACKGROUND

From the budding of the electronic game controller in the late 1970s to the early 1980s, to the innovation of the Nintendo NES controller, and then to the development of modern multifunctional handles, people's demand for interactive devices has been constantly evolving. Traditional handles, by integrating touch pads, gyroscopes, and motion sensing technologies, have gradually met the control requirements of different game types. However, their bulky characteristics severely limit portability and immediacy, restricting the user's interactive experience.

The rise of smart wearable devices should have brought new possibilities for human-computer interaction. However, the reality is disappointing: the vast majority of manufacturers limit these devices to physiological data monitoring, such as step count, heart rate, and blood oxygen. Only a very few manufacturers attempt to apply them to game interaction, and these attempts are often closed and non-universal. Even more troublesome is that, due to the lack of industry standards, there are significant differences in chip models and sensor data processing among manufacturers, resulting in inconsistent gyroscope and accelerometer data, and the zero-drift problem of low-end device data is particularly serious. These technical barriers further hinder the wide application of smart wearable devices in the field of interaction.

In such a context of technical fragmentation and lack of unified standards, how to effectively convert the motion sensor data of smart wearable devices into universal input events and realize cross-platform and cross-application human-computer interaction has become an urgent technical problem to be solved.

SUMMARY

The embodiments of the present application provide a method for operating an application program based on somatosensory, aiming to convert the motion sensor data of smart wearable devices into universal input events and realize cross-platform and cross-application human-computer interaction.

To achieve the above object, the embodiments of the present application provide a method for operating an application program based on somatosensory, including establishing a communication connection with a smart wearable device and obtaining original sensor data of a motion sensor from the smart wearable device.

According to the original sensor data, calibrating a multi-dimensional coordinate system of the motion sensor to obtain a unified matrix of the sensor coordinate system after multi-dimensional calibration.

Performing standardized preprocessing on the original motion data under the unified matrix of the sensor coordinate system to obtain a standardized sensor data stream.

Performing multi-dimensional motion feature extraction on the standardized sensor data stream to obtain a motion feature vector.

Mapping the motion feature vector to a standard input event mapping to obtain a standard input event sequence, where the standard input event includes a keyboard event and a mouse event.

Performing cross-platform standard interface processing on the standard input event sequence to obtain a standardized input event stream that can be transmitted across platforms.

Operating the target application program based on the standardized input event data stream.

In one embodiment, calibrating the multi-dimensional coordinate system of the motion sensor according to the original sensor data to obtain a unified matrix of the sensor coordinate system after multi-dimensional calibration includes based on the original attitude data obtained by the motion sensor in a plurality of preset static attitudes, calibrating a multi-attitude coordinate system of the motion sensor using the reference of the earth's gravity direction to calculate an initial deviation matrix of the motion sensor coordinate system relative to the human anatomical coordinate system.

Performing a functional dynamic calibration on the motion sensor, extracting the motion dynamic characteristics in each action cycle through a preset action sequence.

Based on the motion dynamic characteristics, establishing a nonlinear error mapping model of the sensor coordinate system and generating corresponding coordinate system error correction parameters using a fitting algorithm.

Verifying and evaluating the static calibration and dynamic calibration results according to the external environment perception module of the terminal device.

Calculating the root mean square error and motion range error of the static calibration result and the dynamic calibration result to obtain a unified matrix of the sensor coordinate system after multi-dimensional calibration.

In one embodiment, the external environment perception module includes a camera module;

Verifying and evaluating the static calibration result according to the external environment perception module of the terminal device includes: Collecting a static calibration scene image of the user wearing the motion sensor using the camera module; Preprocessing the static calibration scene image to generate a standardized scene reference image;

Extracting feature points from the standardized scene reference image and performing geometric transformation analysis to obtain an image feature vector;

Matching and comparing the image feature vector with the static calibration parameters in the unified matrix of the motion sensor coordinate system to obtain a static calibration consistency evaluation result; Performing a statistical significance test on the static calibration consistency evaluation result to obtain a reliability index of the static calibration result;

Adapting and optimizing the static calibration parameters of the unified matrix of the motion sensor coordinate system according to the reliability index to obtain optimized static calibration parameters.

In one embodiment, verifying and evaluating the dynamic calibration result according to the external environment perception module of the terminal device includes Performing temporal noise reduction processing on the continuous image sequence of the dynamic calibration process collected by the camera module to obtain a smoothed dynamic calibration reference image sequence;

Performing optical flow analysis and motion trajectory reconstruction on the smoothed dynamic calibration reference image sequence to obtain a dynamic motion feature mapping;

Performing correlation analysis on the dynamic motion feature mapping and the dynamic calibration parameters of the unified matrix of the sensor coordinate system to obtain a dynamic calibration consistency evaluation result;

Performing multi-scale error decomposition and variance analysis on the dynamic calibration consistency evaluation result to obtain the error distribution characteristics of the dynamic calibration result; Constructing a nonlinear correction model of the dynamic calibration parameters based on the error distribution characteristics of the dynamic calibration result to obtain the refined correction values of the dynamic calibration parameters;

In one embodiment, performing standardized preprocessing on the original motion data under the unified matrix of the sensor coordinate system to obtain a standardized sensor data stream includes Performing wavelet transform spectrum decomposition on the original motion data under the unified matrix of the sensor coordinate system to obtain multi-scale frequency components;

Constructing a machine learning-based abnormal recognition model for the multi-scale frequency components to detect and mark abnormal data segments and bad channels in the signal to obtain an abnormal signal mapping;

Applying an adaptive interpolation algorithm to the abnormal data segments in the abnormal signal mapping and reconstructing the signal based on the frequency characteristics of the adjacent normal data segments to obtain the corrected frequency components;

Performing noise filtering on the corrected frequency components based on a preset multi-order filter bank to obtain noise-reduced processing data;

Performing independent component analysis algorithm on the noise-reduced processing data to decompose the multi-dimensional sensor signal into mutually independent functional components to obtain a decoupled signal set;

Generating a standardized sensor data stream after noise reduction and reconstruction based on the decoupled signal set;

In one embodiment, performing multi-dimensional motion feature extraction on the standardized sensor data stream to obtain a motion feature vector includes performing multi-scale Fourier transform on the standardized sensor data stream to obtain a frequency domain feature representation.

Performing time-frequency joint analysis on the frequency feature representation to obtain the time-frequency distribution of the motion features;

Constructing a feature vector clustering algorithm based on the time-frequency distribution of the motion features to obtain a motion feature atom set;

Performing semantic relevance analysis on the motion feature atom set to obtain an action semantic feature mapping;

Generating a multi-dimensional motion feature space vector according to the action semantic feature mapping to obtain a motion feature vector.

In one embodiment, mapping the motion feature vector to a standard input event mapping to obtain a standard input event sequence includes performing semantic parsing and action intention recognition on the motion feature vector to obtain action intention characteristics; constructing an action-event mapping rule library based on the action intention characteristics to obtain a mapping conversion model; performing probabilistic semantic matching on the mapping conversion model to obtain a candidate set of input events for the action semantics; Performing rule filtering and context relevance evaluation on the candidate set of input events to obtain a standardized subset of input events; generating a standard input event sequence with temporal relevance according to the standardized subset of input events.

To achieve the above object, the embodiments of the present application also propose a device for operating an application program based on somatosensory, including A communication module, configured to establish a communication connection with a smart wearable device and obtain original sensor data of a motion sensor from the smart wearable device; A calibration module, configured to calibrate a multi-dimensional coordinate system of the motion sensor according to the original sensor data to obtain a unified matrix of the sensor coordinate system after multi-dimensional calibration; A standardization module, configured to perform standardized preprocessing on the original motion data under the unified matrix of the sensor coordinate system to obtain a standardized sensor data stream; A feature extraction module, configured to perform multi-dimensional motion feature extraction on the sensor data stream to obtain a motion feature vector; A mapping module, configured to map the motion feature vector to a standard input event mapping to obtain a standard input event sequence, where the standard input event includes a keyboard event and a mouse event;

An interface processing module, configured to perform cross-platform standard interface processing on the standard input event sequence to obtain a standardized input event stream that can be transmitted across platforms; An operation module, configured to operate the target application program based on the standardized input event data stream.

To achieve the above object, the embodiments of the present application also propose an equipment for operating an application program based on somatosensory, including a memory, a processor, and a somatosensory-based application program operation program stored in the memory and operable on the processor, where the processor implements the method for operating an application program based on somatosensory according to any one of the above embodiments when executing the somatosensory-based application program operation program.

To achieve the above object, the embodiments of the present application also propose a computer-readable storage medium, the computer-readable storage medium stores a somatosensory-based application program operation program, and when the somatosensory-based application program operation program is executed by a processor, it implements the method for operating an application program based on somatosensory according to any one of the above embodiments.

The technical solution of the present application realizes accurate calibration of motion sensor data through multi-dimensional coordinate system calibration technology, effectively eliminating the system error of sensor data between different devices. By combining static attitude calibration and functional dynamic calibration, the method can establish a nonlinear error mapping model of the sensor coordinate system, greatly improving the consistency and accuracy of sensor data.

Secondly, the technical solution of the present application adopts multi-level data processing technology, including wavelet transform spectrum decomposition, machine learning abnormal recognition, adaptive interpolation, multi-order filter noise reduction, and independent component analysis, realizing comprehensive processing and reconstruction of the original motion data. This complex signal processing technology significantly improves the quality of sensor data, can effectively filter out noise, remove interference, and decouple the multi-dimensional sensor signal into functional components.

Furthermore, the technical solution of the present application constructs a standardized input event mapping mechanism. Through semantic parsing and action intention recognition of the motion feature vector, the motion data from different smart wearable devices is converted into universal mouse and keyboard events. This cross-platform standardized processing method breaks through the limitations of traditional devices, realizes unified access and standardized processing of heterogeneous sensor devices, and significantly enhances the applicability and universality of smart wearable devices in the field of human-computer interaction.

Finally, the technical solution of the present application introduces an external environment perception module (such as a camera) to verify and evaluate the calibration results. Through techniques such as image feature extraction, optical flow analysis, and multi-scale error decomposition, the unified matrix of the sensor coordinate system is adaptively optimized and refinedly corrected. This multi-modal fusion verification mechanism not only improves the reliability of the calibration process but also provides more robust and accurate technical support for complex human-computer interaction scenarios.

DESCRIPTION OF DRAWINGS

To illustrate the technical solutions of the embodiments of the present disclosure more clearly, the following briefly introduces the accompanying drawings that need to be used in the embodiments. It should be understood that the following drawings only show some embodiments of the present disclosure and therefore should not be regarded as limiting the scope. For those of ordinary skill in the art, other relevant drawings can be obtained according to these drawings without creative efforts.

DESCRIPTION OF EMBODIMENTS

The embodiments of the present disclosure are described in detail below. The examples of the embodiments are shown in the accompanying drawings, in which the same or similar reference numerals indicate the same or similar elements or elements with the same or similar functions. The embodiments described below with reference to the accompanying drawings are exemplary and are only used to explain the present disclosure and cannot be construed as limiting the present disclosure.

It should be noted that when an element is referred to as being "fixed to" another element, it can be directly on the other element or there can also be an intervening element. When an element is considered to be "connected" to another element, it can be directly connected to the other element or there may also be an intervening element at the same time. Conversely, when an element is described as being "directly on" another element, there is no intervening element. The terms "vertical", "horizontal", "left", "right", and similar expressions used herein are only for the purpose of illustration.

In the present disclosure, unless otherwise expressly specified and limited, the terms "installation", "connection", "connection", "fixation", and the like should be understood in a broad sense. For example, it can be a fixed connection, a detachable connection, or an integral connection; it can be a mechanical connection or an electrical connection; it can be a direct connection or an indirect connection through an intermediate medium, and it can also be the internal communication of two elements or the interaction relationship between two elements. For those of ordinary skill in the art, the specific meanings of the above terms in the present disclosure can be understood according to specific situations.

In addition, the terms "first" and "second" are only used for descriptive purposes and cannot be construed as indicating or implying relative importance or implicitly indicating the number of technical features indicated. Thus, the features defined with "first" and "second" may explicitly or implicitly include one or more of these features. In the description of the present disclosure, the meaning of "a plurality" is two or more, unless otherwise expressly and specifically defined.

Unless otherwise defined, all technical and scientific terms used herein have the same meaning as commonly understood by those skilled in the technical field to which this application belongs. The terms used in the description of the present disclosure are only for the purpose of describing specific embodiments and are not intended to limit the present disclosure. The term "and/or" used herein includes any and all combinations of one or more of the associated listed items.

Figure 1:
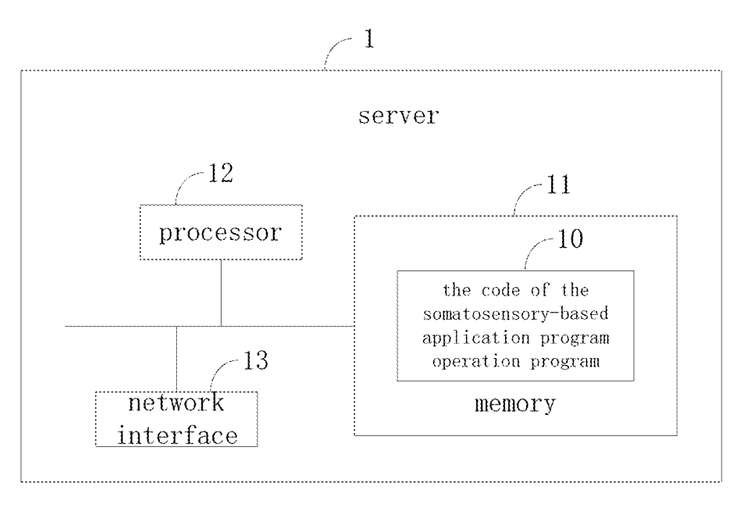
FIG. 1 is a block diagram of the module structure of the somatosensory-based application program operation equipment in an embodiment of the present invention; The realization of the purpose, functional characteristics, and advantages of the present invention will be further described with reference to the embodiments and the accompanying drawings.

As shown in FIG. 1, FIG. 1 is a schematic structural diagram of a server 1 (also known as somatosensory-based application program operation equipment) in the hardware operating environment involved in the embodiment of the present invention.

The server in the embodiment of the present invention includes, but is not limited to, "Internet of Things devices," smart air conditioners with networking functions, smart lights, smart power supplies, AR/VR devices with networking functions, smart speakers, autonomous vehicles, PCs, smartphones, tablets, e-book readers, portable computers, and other devices with display functions.

As shown in FIG. 1, the server 1 includes: a memory 11, a processor 12, and a network interface 13.

The memory 11 includes at least one type of readable storage medium, and the readable storage medium includes flash memory, a hard disk, a multimedia card, a card-type memory (such as an SD or DX memory, etc.), a magnetic memory, a magnetic disk, an optical disk, and the like. In some embodiments, the memory 11 can be an internal storage unit of the server 1, such as the hard disk of the server 1. In other embodiments, the memory 11 can also be an external storage device of the server 1, such as a plug-in hard disk, a smart memory card (SMC), a secure digital (SD) card, a flash memory card, etc. equipped on the server 1.

Furthermore, the memory 11 can also include both the internal storage unit and the external storage device of the server 1. The memory 11 can be used not only to store the application software installed on the server 1 and various types of data, such as the code of the somatosensory-based application program operation program 10, but also to temporarily store the data that has been output or is to be output.

The processor 12 can be a central processing unit (CPU), a controller, a microcontroller, a microprocessor, or other data processing chips in some embodiments, and is used to run the program code stored in the memory 11 or process data, such as executing the somatosensory-based application program operation program 10.

The network interface 13 can optionally include a standard wired interface and a wireless interface (such as a WI-FI interface), and is usually used to establish a communication connection between the server 1 and other electronic devices.

The network can be the Internet, a cloud network, a wireless fidelity (Wi-Fi) network, a personal area network (PAN), a local area network (LAN), and/or a metropolitan area network (MAN). The various devices in the network environment can be configured to connect to the communication network according to various wired and wireless communication protocols. Examples of such wired and wireless communication protocols can include, but are not limited to, at least one of the following: Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, Light Fidelity (Li-Fi), 802.16, IEEE 802.11s, IEEE 802.11g, multi-hop communication, Wireless Access Point (AP), Device-to-Device communication, Cellular communication protocols, and/or Bluetooth communication protocol, or a combination thereof.

Optionally, the server can also include a user interface, and the user interface can include a display (Display), an input unit such as a keyboard (Keyboard), and optionally, the user interface can also include a standard wired interface and a wireless interface. Optionally, in some embodiments, the display can be an LED display, a liquid crystal display, a touch-sensitive liquid crystal display, and an OLED (Organic Light-Emitting Diode) touch screen, etc. The display can also be called a display screen or a display unit, and is used to display the information processed in the server 1 and display a visual user interface.

FIG. 1 only shows the server 1 with components 11-13 and the somatosensory-based application program operation program 10. Those skilled in the art can understand that the structure shown in FIG. 1 does not limit the server 1 and can include fewer or more components than shown, or a combination of certain components, or a different component arrangement.

In this embodiment, the processor 12 can be used to call the somatosensory-based application program operation program stored in the memory 11 and perform the following operations: Establishing a communication connection with a smart wearable device and obtaining original sensor data of a motion sensor from the smart wearable device; According to the original sensor data, calibrating a multi-dimensional coordinate system of the motion sensor to obtain a unified matrix of the sensor coordinate system after multi-dimensional calibration; Performing standardized preprocessing on the original motion data under the unified matrix of the sensor coordinate system to obtain a standardized sensor data stream; Performing multi-dimensional motion feature extraction on the standardized sensor data stream to obtain a motion feature vector; Mapping the motion feature vector to a standard input event mapping to obtain a standard input event sequence, where the standard input event includes a keyboard event and a mouse event; Performing cross-platform standard interface processing on the standard input event sequence to obtain a standardized input event stream that can be transmitted across platforms; Operating the target application program based on the standardized input event data stream.

Based on the hardware architecture of the above somatosensory-based application program operation equipment, an embodiment of the method for operating an application program based on somatosensory of the present invention is proposed. The method for operating an application program based on somatosensory of the present invention aims to convert the motion sensor data of smart wearable devices into universal input events and realize cross-platform and cross-application human-computer interaction.

It is an embodiment of the method for operating an application program based on somatosensory of the present invention. The method for operating an application program based on somatosensory includes the following steps: Step S10 Establish a communication connection with a smart wearable device and obtain original sensor data of a motion sensor from the smart wearable device.

Specifically, the system first establishes a connection with a smart wearable device (such as a smart bracelet, a smart watch, or other wearable sensor devices) through Bluetooth, Wi-Fi, or other wireless communication protocols. After the connection is established, the system obtains the original sensor data from the smart wearable device, and the data includes information such as acceleration, angular velocity, and magnetic field from the motion sensor, which can reflect the user's motion state and posture change.

Optionally, the motion sensor includes, but is not limited to, an accelerometer, a gyroscope, and a magnetometer.

Step S20 According to the original sensor data, calibrate a multi-dimensional coordinate system of the motion sensor to obtain a unified matrix of the sensor coordinate system after multi-dimensional calibration.

Specifically, the original sensor data usually has a certain error or deviation, so it needs to be calibrated through a calibration process. In this embodiment, the system converts the multiple-dimensional coordinates of the sensor through a known calibration method (for example, collecting data using a known reference object or calibration scene), so that the output data of the sensor can accurately reflect the actual motion state. After multi-dimensional coordinate system calibration, the obtained unified matrix of the sensor coordinate system can be used for subsequent data processing and motion analysis.

Step S30 Perform standardized preprocessing on the original motion data under the unified matrix of the sensor coordinate system to obtain a standardized sensor data stream.

Specifically, the system performs standardized processing on the calibrated motion data. The standardized processing includes steps such as noise removal, normalization, and filtering to ensure that the data can be compared on a unified scale. Through standardized processing, the motion data is converted into a standardized sensor data stream, providing an accurate data basis for subsequent feature extraction and application program operation.

Step S40 Perform multi-dimensional motion feature extraction on the sensor data stream to obtain a motion feature vector.

Specifically, the sensor data stream contains a large amount of original data, but in order to perform effective application program operation, it is necessary to extract representative motion features from it. The system analyzes multi-dimensional motion information such as acceleration, rotation angle, and motion trajectory, and uses machine learning algorithms or signal processing methods to extract a set of key motion features (such as motion speed, direction, acceleration change, etc.) to form a motion feature vector. This feature vector can better describe the user's motion behavior.

Step S50 Map the motion feature vector to a standard input event mapping to obtain a standard input event sequence.

Specifically, the system converts the motion feature vector into a corresponding standard input event through preset rules or mapping algorithms. For example, the user's gesture action can be mapped to a "mouse click" event, and the user's waving action can be mapped to a "keyboard key press" event. The system dynamically generates a standard input event sequence according to the different changes of the motion features, and these event sequences can simulate the user's operation on a traditional input device (such as a keyboard and a mouse).

Step S60 Perform cross-platform standard interface processing on the standard input event sequence to obtain a standardized input event stream that can be transmitted across platforms.

Specifically, the standard input event sequence contains multiple events, but these events need to be transmitted and compatible across different platforms. Therefore, the system performs cross-platform processing on the event sequence and converts it into a standardized input event stream that can be compatible with multiple operating systems or application platforms, such as Windows, MacOS, Android, iOS, etc. Through a unified standard interface, it is ensured that the input event stream can be correctly recognized and executed on different platforms.

Step S70 Operate the target application program based on the standardized input event data stream.

Specifically, the system uses the obtained standardized input event stream to simulate the user's operation behavior through a traditional input device (such as a mouse or a keyboard) and control the target application program. The target application program can be any application that supports standard input events, such as word processing software, graphic editing software, game applications, etc. Through somatosensory operation, the user can replace the traditional input method with body movements for operation, realizing a more natural interaction experience.

It can be understood that the method for operating an application program based on somatosensory in this embodiment obtains the user's motion data through a smart wearable device, performs multi-dimensional calibration, standardized processing, and feature extraction on the data, and then simulates the operation of a traditional input device through a standard input event sequence, achieving the following technical effects:

This method enables the user to naturally operate the application program through a somatosensory device, avoiding the limitations of traditional input devices and enhancing the intuitiveness and immersion of the user experience;

Through cross-platform interface processing, this method can achieve interoperability on multiple operating systems and devices, with strong applicability;

While ensuring high-precision motion capture and input data consistency, this method also effectively simplifies the input operation process and improves the convenience of operation.

In some embodiments, calibrating the multi-dimensional coordinate system of the motion sensor according to the original sensor data to obtain a unified matrix of the sensor coordinate system after multi-dimensional calibration includes:

Step S21 Based on the original attitude data obtained by the motion sensor in a plurality of preset static attitudes, calibrate a multi-attitude coordinate system of the motion sensor using the reference of the earth's gravity direction to calculate an initial deviation matrix of the motion sensor coordinate system relative to the human anatomical coordinate system.

Specifically, the system first collects the original attitude data through the motion sensor in a plurality of preset static attitudes (such as different postures such as stationary, bending, and stretching). These attitude data contain information such as acceleration, angular velocity, and magnetic field strength of the sensor in a static state. According to these static data, the system uses the direction of the earth's gravity (i.e., the gravitational acceleration in the vertical direction) as a reference to perform multi-attitude coordinate system calibration, matches the measurement data of the sensor with the human anatomical coordinate system, and calculates an initial deviation matrix of the motion sensor coordinate system relative to the human anatomical coordinate system. This deviation matrix is used to correct the sensor output error caused by attitude deviation.

Step S22 Perform a functional dynamic calibration on the motion sensor, extracting the motion dynamic characteristics in each action cycle through a preset action sequence.

Specifically, static calibration can only correct the deviation of the sensor at rest, but during dynamic motion, the output data of the sensor may be affected by more factors. Therefore, the system designs a preset action sequence (such as arm waving, jumping, turning, etc.) to simulate various dynamic behaviors of the user in daily motion. The system extracts the motion dynamic characteristics in each action cycle through these action sequences, including information such as acceleration change, angular velocity change, and motion trajectory. These characteristics help to further optimize the performance of the sensor in a dynamic state.

Step S23 Based on the motion dynamic characteristics, establish a nonlinear error mapping model of the sensor coordinate system and generate corresponding coordinate system error correction parameters using a fitting algorithm.

Specifically, the system establishes a nonlinear error mapping model of the sensor coordinate system based on the extracted motion dynamic characteristics. This model can describe the error distribution and change law of the sensor coordinate system during the dynamic process. Through a fitting algorithm (such as the least squares method, nonlinear optimization algorithm, etc.), the system can solve the correction parameters used to correct the error of the sensor coordinate system in a dynamic state. This step is crucial for improving the accuracy of dynamic motion data.

Step S24 Verify and evaluate the static calibration and dynamic calibration results according to the external environment perception module of the terminal device.

Specifically, the terminal device is usually equipped with an external environment perception module (such as a camera, a laser rangefinder, an infrared sensor, a radar, or an environmental sensor, etc.) to obtain external environment information. The system uses these modules to verify and evaluate the static calibration and dynamic calibration results. For example, the terminal device can verify the position and attitude of the sensor in the static and dynamic processes through a visual recognition algorithm and compare them with the expected results, thereby evaluating the accuracy and reliability of the calibration process.

Step S25 Calculate the root mean square error and motion range error of the static calibration result and the dynamic calibration result to obtain a unified matrix of the sensor coordinate system after multi-dimensional calibration.

Specifically, the system calculates the root mean square error (RMSE) and motion range error (such as position deviation, angle deviation, etc.) of the static calibration and dynamic calibration results, and these error indicators are used to evaluate the calibration accuracy. Through these calculations, the system can determine whether the calibration result meets the accuracy requirements and adjust the calibration parameters according to the error results. Finally, aunified matrix of the sensor coordinate system after multi-dimensional calibration is obtained. This calibration matrix can be used for subsequent sensor data processing and application program operation to ensure the high precision and consistency of the sensor data.

It can be understood that the multi-dimensional coordinate system calibration method in this embodiment effectively eliminates the deviation and error of the motion sensor by combining static and dynamic calibration steps. This method can not only improve the measurement accuracy of the sensor in a static situation but also correct the nonlinear error during the dynamic motion process, thereby improving the accuracy and reliability of the motion data. In addition, using the external environment perception module for verification and evaluation further enhances the accuracy and robustness of the calibration process. Through these technical means, this embodiment can provide a high-precision input data stream for the somatosensory-based application program, significantly improving the quality of the user interaction experience.

In some embodiments, the external environment perception module includes a camera module.

Verifying and evaluating the static calibration result according to the external environment perception module of the terminal device includes Step S110 Collect a static calibration scene image of the user wearing the motion sensor using the camera module.

Specifically, the terminal device captures a static calibration scene image when the user wears the motion sensor through the integrated camera module. This scene usually includes the user's static posture and may also include some calibration tools (such as a specific calibration plate, a standard coordinate system reference object, etc.). These images provide a reference basis for subsequent static calibration verification. The resolution and accuracy of the camera module need to ensure that the details of the user and the calibration tools can be clearly captured to provide sufficient data for subsequent analysis.

Step S120 Preprocess the static calibration scene image to generate a standardized scene reference image. Specifically, the collected static calibration scene image may be affected by factors such as noise, light changes, and perspective distortion, so it needs to be preprocessed. The system generates a standardized scene reference image through methods such as image denoising, contrast adjustment, and color standardization. The purpose of this step is to eliminate the influence of the external environment and shooting conditions on the image, making the subsequent feature extraction process more stable and accurate.

Step S130 Extract feature points from the standardized scene reference image and perform geometric transformation analysis to obtain an image feature vector.

Specifically, the system uses computer vision technology (such as SIFT, SURF, ORB, and other feature point detection algorithms) to extract representative feature points from the standardized scene reference image. Then, through geometric transformation analysis (such as homography matrix calculation, perspective transformation, etc.), the feature points in the image are analyzed to obtain an image feature vector. These feature vectors contain the spatial position information of each key feature point in the image and provide a basis for subsequent calibration consistency comparison.

Step S140 Match and compare the image feature vector with the static calibration parameters in the unified matrix of the motion sensor coordinate system to obtain a static calibration consistency evaluation result.

Specifically, by matching the image feature vector with the static calibration parameters in the unified matrix of the motion sensor coordinate system, the system can compare whether the sensor coordinate system is consistent with the coordinate system in the actual scene image. This matching process is achieved by calculating the relationship between the feature points in the sensor coordinate system and the image coordinate system. Through comparison, the system can evaluate the accuracy and consistency of the static calibration result and obtain a static calibration consistency evaluation result.

Step S150 Perform a statistical significance test on the static calibration consistency evaluation result to obtain a reliability index of the static calibration result.

Specifically, the system uses statistical methods (such as t-test, chi-square test, etc.) to perform a significance test on the static calibration consistency evaluation result to determine the reliability of the calibration result. Through this method, the system can determine the accuracy of the calibration parameters and avoid result deviation caused by random errors or systematic errors. The reliability index reflects the credibility of the static calibration result and provides a basis for subsequent optimization and adjustment.

Step S160 Adapt and optimize the static calibration parameters of the unified matrix of the motion sensor coordinate system according to the reliability index to obtain optimized static calibration parameters.

Specifically, the system uses an adaptive optimization algorithm (such as the least squares method, gradient descent method, etc.) to optimize and adjust the static calibration parameters according to the reliability index of the static calibration result. The optimization process aims to improve the calibration accuracy and reduce the deviation caused by sensor errors or external factors. The optimized static calibration parameters will more accurately reflect the actual motion state of the sensor, thereby improving the accuracy of subsequent data processing.

It can be understood that this embodiment realizes the verification and evaluation of the static calibration result by combining the image analysis of the static calibration scene with the camera module. This method can effectively eliminate the deviation caused by calibration errors and improve the accuracy and reliability of the static calibration through multi-level analysis and optimization. The specific technical effects include:

Using image preprocessing and feature point extraction technology enhances the stability and accuracy of the image data, making the verification of the static calibration result more accurate;

Performing a statistical significance test ensures the reliability of the static calibration result and avoids errors caused by accidental factors;

Adjusting the calibration parameters through an adaptive optimization algorithm further improves the accuracy of the static calibration and ensures the accuracy and reliability of the subsequent sensor data.

Therefore, this embodiment effectively improves the calibration accuracy of the motion sensor in the somatosensory operating system and further enhances the accuracy and fluency of the user interaction experience.

In some embodiments, verifying and evaluating the dynamic calibration result according to the external environment perception module of the terminal device includes:

Step S210 Perform temporal noise reduction processing on the continuous image sequence of the dynamic calibration process collected by the camera module to obtain a smoothed dynamic calibration reference image sequence.

Specifically, the image sequence of the dynamic calibration process collected by the camera module may be affected by factors such as light changes, motion blur, and background noise. Therefore, the system first performs temporal noise reduction processing on these continuous image sequences. The noise reduction processing can use time-based filtering algorithms (such as Kalman filtering, time-weighted averaging, etc.) to smooth the noise in the continuous images and remove the interference introduced by motion and environmental factors. Through noise reduction, the system can obtain a more smoothed and clear dynamic calibration reference image sequence, ensuring the accuracy of subsequent analysis.

Step S220 Perform optical flow analysis and motion trajectory reconstruction on the smoothed dynamic calibration reference image sequence to obtain a dynamic motion feature mapping.

Specifically, optical flow analysis is a common computer vision technique used to describe the motion of pixels in an image. In this embodiment, the system uses an optical flow algorithm (such as the Lucas-Kanade algorithm) to analyze the smoothed dynamic calibration reference image sequence, tracks the motion trajectory of each feature point in the image, and then reconstructs the motion trajectory of the object or sensor during the dynamic process. Through this analysis, the system can obtain a set of dynamic motion feature mappings, which contain information such as the acceleration, velocity, and displacement of the sensor during the motion process, and these information are important bases for evaluating the dynamic calibration result.

Step S230 Perform correlation analysis on the dynamic motion feature mapping and the dynamic calibration parameters of the unified matrix of the sensor coordinate system to obtain a dynamic calibration consistency evaluation result.

Specifically, the system performs correlation analysis on the dynamic motion feature mapping and the dynamic calibration parameters in the unified matrix of the sensor coordinate system to evaluate the matching degree between them. This process usually uses the Pearson correlation coefficient or other correlation analysis methods to quantify the consistency between the motion features in the image and the sensor data. Through this analysis, the system can determine whether the sensor coordinate system accurately reflects the user's real motion during the dynamic process, thereby obtaining a dynamic calibration consistency evaluation result and evaluating the accuracy of the dynamic calibration parameters.

Step S240 Perform multi-scale error decomposition and variance analysis on the dynamic calibration consistency evaluation result to obtain the error distribution characteristics of the dynamic calibration result.

Specifically, the system decomposes the dynamic calibration consistency evaluation result into multi-scale errors and analyzes the error distribution in different scales. For example, the system can divide the errors according to time scales, space scales, or motion stages and analyze them separately. Through variance analysis, the system can obtain the variance and distribution characteristics of the errors in different scales, thereby evaluating the error sources and error distribution patterns in the dynamic calibration process. This process helps to identify potential problems in the dynamic calibration, such as nonlinear errors and scale inconsistencies.

Step S250 Construct a nonlinear correction model of the dynamic calibration parameters based on the error distribution characteristics of the dynamic calibration result to obtain the refined correction values of the dynamic calibration parameters.

Specifically, the system constructs a nonlinear correction model of the dynamic calibration parameters based on the error distribution characteristics of the dynamic calibration result. This model is used to describe the nonlinear distribution of errors in the dynamic calibration process. Common correction methods include using high-order polynomial regression, neural networks, and other nonlinear optimization algorithms. By fitting the error distribution, the system can obtain the refined correction values of the dynamic calibration parameters. These correction values can effectively reduce the calibration error, improve the data accuracy in the dynamic process, and optimize the user interaction experience.

It can be understood that this embodiment realizes the verification and evaluation of the dynamic calibration result by processing and analyzing the image sequence of the dynamic calibration process with the camera module. The specific technical effects include Temporal noise reduction processing eliminates the noise interference in the image sequence and improves the quality of the dynamic calibration reference image;

Optical flow analysis and motion trajectory reconstruction accurately extract the motion features of the sensor during the dynamic process, ensuring the authenticity of the subsequent calibration result;

Correlation analysis, error decomposition, and variance analysis comprehensively evaluate the consistency and error distribution of the dynamic calibration parameters and identify potential error sources;

Constructing a nonlinear correction model refines the dynamic calibration parameters and further improves the accuracy and reliability of the dynamic calibration.

Therefore, this embodiment can provide a more accurate and stable dynamic calibration data stream for the somatosensory-based application program and improve the adaptability and accuracy of the system in a complex dynamic environment.

In some embodiments, performing standardized preprocessing on the original motion data under the unified matrix of the sensor coordinate system to obtain a standardized sensor data stream includes:

Step S31 Perform wavelet transform spectrum decomposition on the original motion data under the unified matrix of the sensor coordinate system to obtain multi-scale frequency components.

Specifically, wavelet transform is a widely used signal processing technique that can perform multi-scale spectrum analysis on signals. In this embodiment, the original motion data under the unified matrix of the sensor coordinate system is first wavelet transformed, and the frequency components of the signal are separated at different scales by decomposing the signal. Wavelet transform can effectively extract the high-frequency and low-frequency components in the motion data, which is helpful for subsequent processing and abnormal signal recognition. This process selects an appropriate wavelet basis function (such as Haar wavelet, Daubechies wavelet, etc.) to decompose the original motion data into multiple frequency levels to more accurately analyze the time-frequency characteristics of the signal.

Step S32 Construct a machine learning-based abnormal recognition model for the multi-scale frequency components to detect and mark abnormal data segments and bad channels in the signal to obtain an abnormal signal mapping.

Specifically, the abnormal recognition model analyzes the multi-scale frequency components based on machine learning algorithms (such as support vector machines, decision trees, neural networks, etc.) and recognizes abnormal signals by learning the patterns of normal motion data. This model can automatically detect abnormal data segments or bad channels in the motion data, such as abnormal signals caused by equipment failure, environmental interference, or sensor errors. The system establishes this model through a training data set and uses it to mark the abnormal parts in the actually collected signal to generate an abnormal signal mapping. This process can significantly improve the data quality and avoid the interference of abnormal data on subsequent analysis.

Step S33 Apply an adaptive interpolation algorithm to the abnormal data segments in the abnormal signal mapping and reconstruct the signal based on the frequency characteristics of the adjacent normal data segments to obtain the corrected frequency components.

Specifically, for the identified abnormal data segments, the system uses an adaptive interpolation algorithm for reconstruction. The interpolation algorithm corrects the abnormal data using the frequency characteristics (such as mean, median, spectral characteristics, etc.) of the adjacent normal data segments. The advantage of adaptive interpolation is that it can automatically adjust the interpolation strategy according to the local characteristics of the data, thereby avoiding over-correction or distortion. Finally, the signal reconstructed by this algorithm can more accurately reflect the real motion data of the sensor.

Step S34 Perform noise filtering on the corrected frequency components based on a preset multi-order filter bank to obtain noise-reduced processing data.

Specifically, the corrected frequency components may still contain noise from the environment, equipment, etc. Therefore, the system uses a preset multi-order filter bank for noise filtering. The multi-order filter bank is composed of multiple filters with different frequency bandwidths and can efficiently remove noise in different frequency bands. According to the frequency characteristics of the sensor data, the system selects appropriate filters for high-pass, low-pass, or band-pass filtering to remove the noise components from the motion signal and retain the real motion characteristics. Through this step, the quality of the data is further improved.

Step S35 Perform independent component analysis algorithm on the noise-reduced processing data to decompose the multi-dimensional sensor signal into mutually independent functional components to obtain a decoupled signal set.

Specifically, the independent component analysis (ICA) algorithm is a commonly used technique for blind signal separation and can decompose a multi-dimensional sensor signal into several independent components. In this embodiment, the system uses the ICA algorithm to analyze the multi-dimensional sensor data after noise reduction and decompose it into a set of mutually independent functional signal components. These components may correspond to different motion patterns or different sensor functions, such as acceleration, angular velocity, etc. Through ICA, the system can effectively decouple different signal sources and extract the independent features of each motion pattern, improving the accuracy of data processing.

Step S36 Generate a standardized sensor data stream after noise reduction and reconstruction based on the decoupled signal set.

Specifically, the decoupled signal set after ICA contains the independent components of the multi-dimensional sensor data. These components, after noise reduction and reconstruction, have fully reflected the user's motion state. The system recombines these decoupled signal sets to generate a standardized sensor data stream. The standardized data stream, after noise reduction, interpolation, filtering, and decoupling, has eliminated various interference factors and can truly reflect the user's motion behavior. This standardized data stream can be used by subsequent application programs or analysis models for more accurate motion analysis, recognition, or control.

It can be understood that this embodiment can significantly improve the accuracy and reliability of the motion data by performing multi-level preprocessing on the sensor data. The specific technical effects include:

Wavelet transform spectrum decomposition of the original motion data extracts multi-scale frequency components, which helps to more accurately analyze the time-frequency characteristics of the motion data;

The machine learning-based abnormal recognition model automatically identifies abnormal signals and bad channels, improving the quality and credibility of the data;

Adaptive interpolation algorithm corrects abnormal data segments, ensuring the integrity and consistency of the data;

Multi-order filter bank noise removal further improves the accuracy of the signal;

Independent component analysis decouples the signal, improving the extraction accuracy of different motion patterns.

Therefore, this embodiment can effectively process and optimize the sensor data, provide a high-quality, standardized data stream, and meet the needs of complex tasks such as somatosensory applications and motion recognition.

In some embodiments, performing multi-dimensional motion feature extraction on the standardized sensor data stream to obtain a motion feature vector includes:

Step S41 Perform multi-scale Fourier transform on the standardized sensor data stream to obtain a frequency domain feature representation.

Specifically, multi-scale Fourier transform is a commonly used signal processing technique for converting a time-domain signal into a frequency-domain feature. In this embodiment, the standardized sensor data stream is Fourier transformed to extract the frequency information of the signal. By performing multi-scale analysis on the data stream, different frequency-band motion features can be identified, and a frequency-domain feature representation helpful for subsequent analysis can be extracted. This process can reveal the frequency distribution characteristics of the motion data and help identify different motion patterns.

Step S42 Perform time-frequency joint analysis on the frequency domain feature representation to obtain the time-frequency distribution of the motion features.

Specifically, time-frequency joint analysis is a method that combines time and frequency characteristics and can more comprehensively describe the dynamic changes of the signal. In this embodiment, the system performs time-frequency joint analysis (such as short-time Fourier transform, wavelet transform, etc.) on the frequency domain feature representation to combine the frequency-domain feature with time information and obtain the time-frequency distribution of the motion features. This distribution can reflect the frequency characteristics of the motion signal changing with time and provide more detailed information about the motion pattern, which is helpful for distinguishing different motion states.

Step S43 Construct a feature vector clustering algorithm based on the time-frequency distribution of the motion features to obtain a motion feature atom set.

Specifically, the feature vector clustering algorithm classifies the motion features to find the potential laws and patterns in the data. In this embodiment, the system uses a feature vector clustering algorithm (such as K-means, DBSCAN, etc.) to cluster the motion features based on the time-frequency distribution obtained from the time-frequency joint analysis. This clustering process can group similar motion features into one class, thereby obtaining a motion feature atom set, which represents different motion patterns or states. The clustered feature atom set is helpful for further action recognition and semantic analysis.

Step S44 Perform semantic relevance analysis on the motion feature atom set to obtain an action semantic feature mapping.

Specifically, the semantic relevance analysis aims to mine the potential associations between features and understand their semantic meanings. In this embodiment, the system performs semantic relevance analysis on the clustered motion feature atom set to identify the relationships between the features and specific actions or behaviors. By analyzing the semantics of the feature atom set, the system can map the features related to actions. For example, some motion features may be related to the "waving" action, and some may be related to the "running" action. This step helps to correspond the motion data with the actual action semantics, thereby improving the accuracy of action recognition.

Step S45 Generate a multi-dimensional motion feature space vector according to the action semantic feature mapping to obtain a motion feature vector.

Specifically, the motion feature vector is a multi-dimensional representation of the motion features and can comprehensively describe the dynamic characteristics of the action. In this embodiment, the system generates a multi-dimensional motion feature space vector according to the analysis results obtained from the action semantic feature mapping. This vector fuses the semantic association information of different feature atom sets to form a comprehensive motion feature description. The motion feature vector contains information such as the time, frequency, and semantics of the motion and can effectively represent the user's motion state and be used for subsequent application analysis, action recognition, or control.

It can be understood that this embodiment can effectively extract valuable motion features from the standardized sensor data stream through the multi-dimensional motion feature extraction method. The specific technical effects include Multi-scale Fourier transform extracts the frequency-domain features of the motion signal, revealing the frequency distribution of the motion data;

2. Time-frequency joint analysis combines time and frequency information to obtain a more abundant motion feature description;
3. The feature vector clustering algorithm extracts the motion feature atom set, identifying different motion patterns;
4. Semantic relevance analysis corresponds the motion features with actual actions to obtain the action semantic feature mapping.

Therefore, this embodiment can efficiently and accurately extract motion features from the sensor data, providing basic data support for various somatosensory applications, motion analysis, and control.

In some embodiments, mapping the motion feature vector to a standard input event mapping to obtain a standard input event sequence includes:

Step S51 Perform semantic parsing and action intention recognition on the motion feature vector to obtain action intention characteristics.

Specifically, the purpose of semantic parsing and action intention recognition is to analyze the user's intention and action intention based on the motion information extracted from the motion feature vector. In this embodiment, the system first performs semantic parsing on the motion feature vector to identify the specific action features contained in the vector. Then, it uses an action intention recognition algorithm (such as a deep learning-based model, decision tree, etc.) to extract the action intention characteristics, such as whether the user intends to perform operations such as "clicking," "sliding," or "scrolling." This step correlates the motion data with the user's action intention, laying the foundation for subsequent input event mapping.

Step S52 Construct an action-event mapping rule library based on the action intention characteristics to obtain a mapping conversion model.

Specifically, the action-event mapping rule library is a set of rules that map the user's action intention to specific input events. In this embodiment, the system constructs a mapping rule library based on the action intention characteristics. Each rule in the library defines the relationship between one or more action intentions and the corresponding standard input events. Through the rule library, the system can convert the recognized action intentions (such as "swiping up" or "clicking") into specific input events (such as mouse clicks, keyboard key presses, etc.). This mapping conversion model can efficiently achieve the accurate correspondence between actions and input events.

Step S53 Perform probabilistic semantic matching on the mapping conversion model to obtain a candidate set of input events for the action semantics.

Specifically, probabilistic semantic matching calculates the most likely input event candidate set based on the action intention characteristics and the rules in the mapping rule library. In this embodiment, the system uses a probability model (such as a Bayesian network, maximum entropy model, etc.) to match the action intention characteristics with the event rule library and evaluate the matching probability of each input event rule. Through this way, the system can generate one or more input event candidate sets according to the action intention, and each candidate set corresponds to one or more input events and is accompanied by their occurrence probabilities. This process provides multiple alternative options for the selection of subsequent input events.

Step S54 Perform rule filtering and context relevance evaluation on the candidate set of input events to obtain a standardized subset of input events.

Specifically, rule filtering and context relevance evaluation are the processes of screening the input event candidate set based on specific context information. In this embodiment, the system filters and evaluates the input event candidate set according to the current environment, the user's behavior state, or other context information (such as the type of input device, the state of the operation interface, etc.). For example, some input events may not be applicable in a specific situation, or some actions may require specific device support. Through rule filtering and context evaluation, the system can obtain a standardized subset of input events that accurately reflects the user's real operation intention according to the current context.

Step S55 Generate a standard input event sequence with temporal relevance according to the standardized subset of input events.

Specifically, the purpose of generating a standard input event sequence is to arrange the input events in chronological order and maintain the temporal relevance between the events. In this embodiment, the system generates a temporally related input event sequence according to the standardized subset of input events. Each input event not only includes the event type (such as mouse click, keyboard key press, etc.) but also includes the timestamp or relative temporal information of the event occurrence. Through this way, the system can ensure the temporality of the input events, avoid time conflicts or inconsistencies between the events, and provide an accurate input data stream for subsequent system interaction or application program operation.

It can be understood that this embodiment realizes the effective conversion from the user's somatosensory motion to the standard input event through the process of mapping the motion feature vector to the standard input event mapping. The specific technical effects include:

Semantic parsing and action intention recognition extract the user's action intention from the motion feature vector and provide a basis for the subsequent matching of input events;

Constructing an action-event mapping rule library establishes a direct mapping relationship between the action intention and the standard input event;

Probabilistic semantic matching generates multiple event candidate sets according to the occurrence probability of the input events, improving the adaptability of the system;

Rule filtering and context relevance evaluation screen out the standard input event subset consistent with the current context, ensuring the accuracy of the events.

Therefore, this embodiment can efficiently and accurately convert the somatosensory motion data into a standardized input event stream, providing natural and smooth operation control for the somatosensory-based application program.

In some embodiments, performing cross-platform standard interface processing on the standard input event sequence to obtain a standardized input event stream that can be transmitted across platforms includes:

Step S61 Perform event type normalization processing on the standard input event sequence to obtain a unified coding set of event types.

Specifically, the purpose of event type normalization processing is to ensure that the types of input events have a unified representation method across different platforms. In this embodiment, the system first normalizes each event in the standard input event sequence, standardizing its type and format. For example, different platforms may have different representations of certain input events (such as mouse clicks, keyboard key presses, etc.), and through normalization processing, the system can map the input event types of all platforms to a unified coding standard, thereby avoiding platform differences. This operation converts all input event types into a unified coding set of event types, facilitating subsequent processing and conversion.

Step S62 Construct a cross-operating system universal event mapping protocol based on the unified coding set of event types to obtain a platform-independent event conversion model.

Specifically, the purpose of constructing a cross-operating system universal event mapping protocol is to ensure that the input events can be seamlessly transmitted across different operating systems and platforms. In this embodiment, the system constructs a platform-independent event conversion model based on the unified coding set of event types. This model specifies the mapping rules and conversion methods of input events on different platforms (such as Windows, Linux, macOS, iOS, Android, etc.). For example, some operating systems may use different event codes or structures to represent the same input event, and the universal event mapping protocol will ensure that these platforms can correctly understand and convert the input events. Through this protocol, the system can ensure the compatibility and correct transmission of the input events.

Step S63 Perform semantic compatibility analysis on the platform-independent event conversion model to obtain event semantic mapping rules.

Specifically, the purpose of semantic compatibility analysis is to ensure that the semantics of the input events remain consistent across different platforms. In this embodiment, the system performs semantic analysis on the platform-independent event conversion model to evaluate the semantic consistency of the input events on different platforms. Since the input devices and interfaces of different platforms may vary, semantic compatibility analysis ensures that even on different hardware and operating systems, the core semantics of the events (such as "single click" or "slide") can still be correctly understood and processed. Through semantic compatibility analysis, the system can obtain a set of event semantic mapping rules that specify how to map the semantics of the input events across different platforms.

Step S64 Perform data packet encoding on the event semantic mapping rules based on a preset standardized event encapsulation method to obtain a standardized input event stream data packet.

Specifically, the purpose of data packet encoding is to package the standardized input event stream into a format that can be transmitted in the network. In this embodiment, the system converts the event semantic mapping rules into data packets based on a preset standardized event encapsulation method. Specifically, the system encapsulates each input event and its corresponding semantic features (such as event type, timestamp, coordinate information, etc.) according to a certain data format to form a standardized input event stream data packet. This process ensures that the input events can be transmitted in a unified format across different platforms while maintaining the integrity and accuracy of the events.

Step S65 Perform encryption and compression processing on the standardized input event stream data packet to obtain a cross-platform input event stream.

Specifically, the purpose of encryption and compression processing is to improve the security and efficiency of data transmission. In this embodiment, the system encrypts the standardized input event stream data packet to ensure that the input event data is not tampered with or leaked during transmission. The encryption method can adopt symmetric encryption, asymmetric encryption, or hash encryption technologies. In addition, the system also compresses the data packet to reduce the bandwidth required for data transmission and improve the transmission efficiency. Through encryption and compression processing, the system can generate a cross-platform input event stream that can be efficiently and securely transmitted between multiple operating systems and devices.

It can be understood that this embodiment realizes the efficient transmission of input events across different platforms by performing cross-platform standard interface processing on the standard input event sequence. The specific technical effects include:

Event type normalization processing unifies the coding of input event types on different platforms, ensuring the consistency of cross-platform operations;

Constructing a cross-operating system universal event mapping protocol ensures that different platforms can correctly understand and convert input events;

Semantic compatibility analysis ensures that the input events on different platforms have the same semantic expression, enabling the events to be correctly parsed;

Data packet encoding packages the input event stream, preparing for cross-platform transmission;

Encryption and compression processing improve the security and transmission efficiency of the input event stream, ensuring that the event stream can be safely and quickly transmitted across different platforms.

Therefore, this embodiment can effectively realize the transmission of a cross-platform input event stream based on different platforms, ensuring compatibility and operation consistency in a multi-platform environment and further enhancing the user's cross-platform application experience.

In addition, the embodiment of the present invention also proposes a device for operating an application program based on somatosensory. The device for operating an application program based on somatosensory includes A communication module 110, configured to establish a communication connection with a smart wearable device and obtain original sensor data of a motion sensor from the smart wearable device; A calibration module 120, configured to calibrate a multi-dimensional coordinate system of the motion sensor according to the original sensor data to obtain a unified matrix of the sensor coordinate system after multi-dimensional calibration; A standardization module 130, configured to perform standardized preprocessing on the original motion data under the unified matrix of the sensor coordinate system to obtain a standardized sensor data stream; A feature extraction module 140, configured to perform multi-dimensional motion feature extraction on the sensor data stream to obtain a motion feature vector; A mapping module 150, configured to map the motion feature vector to a standard input event mapping to obtain a standard input event sequence, where the standard input event includes a keyboard event and a mouse event; An interface processing module 160, configured to perform cross-platform standard interface processing on the standard input event sequence to obtain a standardized input event stream that can be transmitted across platforms;

An operation module 170, configured to operate the target application program based on the standardized input event data stream.

The steps implemented by each functional module of the device for operating an application program based on somatosensory can refer to the embodiments of the method for operating an application program based on somatosensory of the present invention, and are not repeated here.

In addition, the embodiment of the present invention also proposes a computer-readable storage medium. The computer-readable storage medium can be any one or a combination of several of a hard disk, a multimedia card, an SD card, a flash memory card, an SMC, a read-only memory (ROM), an erasable programmable read-only memory (EPROM), a portable compact disc read-only memory (CD-ROM), a USB memory, etc. The computer-readable storage medium includes a somatosensory-based application program operation program 10. The specific implementation manner of the computer-readable storage medium of the present invention is substantially the same as that of the above-mentioned method for operating an application program based on somatosensory and the server 1, and is not repeated here.

Those skilled in the art should understand that the embodiments of the present invention can be provided as a method, a system, or a computer program product. Therefore, the present invention can adopt the form of a complete hardware embodiment, a complete software embodiment, or an embodiment combining software and hardware. Moreover, the present invention can adopt the form of a computer program product implemented on one or more computer-readable storage media (including but not limited to disk storage, CD-ROM, optical storage, etc.) containing computer-usable program code.

The present invention is described with reference to the flowcharts and/or block diagrams of the method, equipment (system), and computer program product according to the embodiments of the present invention. It should be understood that each flow and/or block in the flowcharts and/or block diagrams and the combination of the flows and/or blocks in the flowcharts and/or block diagrams can be implemented by computer program instructions. These computer program instructions can be provided to a general-purpose computer, a special-purpose computer, an embedded processor, or other programmable data processing equipment to produce a machine, such that the instructions executed by the computer or other programmable data processing equipment produce a device for implementing the functions specified in one or more flows of the flowcharts and/or one or more blocks of the block diagrams.

These computer program instructions can also be stored in a computer-readable memory that can guide the computer or other programmable data processing equipment to work in a specific manner, such that the instructions stored in the computer-readable memory produce a manufacturing product including an instruction device, and the instruction device implements the functions specified in one or more flows of the flowcharts and/or one or more blocks of the block diagrams.

These computer program instructions can also be loaded onto a computer or other programmable data processing equipment to cause a series of operation steps to be executed on the computer or other programmable equipment to produce computer-implemented processing, such that the instructions executed on the computer or other programmable equipment provide steps for implementing the functions specified in one or more flows of the flowcharts and/or one or more blocks of the block diagrams.

Although the preferred embodiments of the present invention have been described, those skilled in the art can make additional changes and modifications to these embodiments once they know the basic inventive concept. Therefore, the appended claims are intended to be construed to include the preferred embodiments and all changes and modifications that fall within the scope of the present invention.

Obviously, those skilled in the art can make various modifications and variations to the present invention without departing from the spirit and scope of the present invention. Thus, if these modifications and variations of the present invention fall within the scope of the claims and their equivalent technologies, the present invention is also intended to include these modifications and variations

The invention claimed is:

1. A method for operating an application program based on somatosensory, comprising establishing a communication connection with a smart wearable device and obtaining original sensor data of a motion sensor from the smart wearable device;
   according to the original sensor data, calibrating a multi-dimensional coordinate system of the motion sensor to obtain a unified matrix of the sensor coordinate system after multi-dimensional calibration;
   performing standardized preprocessing on the original motion data under the unified matrix of the sensor coordinate system to obtain a standardized sensor data stream;
   performing multi-dimensional motion feature extraction on the standardized sensor data stream to obtain a motion feature vector;
   mapping the motion feature vector to a standard input event mapping to obtain a standard input event sequence, wherein the standard input event includes a keyboard event and a mouse event;
   performing cross-platform standard interface processing on the standard input event sequence to obtain a standardized input event stream that can be transmitted across platforms; and
   operating the target application program based on the standardized input event data stream.

2. The method for operating an application program based on somatosensory according to claim 1, wherein calibrating the multi-dimensional coordinate system of the motion sensor according to the original sensor data to obtain a unified matrix of the sensor coordinate system after multi-dimensional calibration comprises:
   based on the original attitude data obtained by the motion sensor in a plurality of preset static attitudes, calibrating a multi-attitude coordinate system of the motion sensor using the reference of the earth's gravity direction to calculate an initial deviation matrix of the motion sensor coordinate system relative to the human anatomical coordinate system;
   performing a functional dynamic calibration on the motion sensor, extracting the motion dynamic characteristics in each action cycle through a preset action sequence;
   based on the motion dynamic characteristics, establishing a nonlinear error mapping model of the sensor coordinate system and generating corresponding coordinate system error correction parameters using a fitting algorithm;
   verifying and evaluating the static calibration and dynamic calibration results according to the external environment perception module of the terminal device; and
   calculating the root mean square error and motion range error of the static calibration result and the dynamic calibration result to obtain a unified matrix of the sensor coordinate system after multi-dimensional calibration.

3. The method for operating an application program based on somatosensory according to claim 2, wherein the external environment perception module includes a camera module;
   verifying and evaluating the static calibration result according to the external environment perception module of the terminal device comprises:
   collecting a static calibration scene image of the user wearing the motion sensor using the camera module;
   preprocessing the static calibration scene image to generate a standardized scene reference image;
   extracting feature points from the standardized scene reference image and performing geometric transformation analysis to obtain an image feature vector;
   matching and comparing the image feature vector with the static calibration parameters in the unified matrix of the motion sensor coordinate system to obtain a static calibration consistency evaluation result;
   performing a statistical significance test on the static calibration consistency evaluation result to obtain a reliability index of the static calibration result; and
   adapting and optimizing the static calibration parameters of the unified matrix of the motion sensor coordinate system according to the reliability index to obtain optimized static calibration parameters.

4. The method for operating an application program based on somatosensory according to claim 3, wherein verifying and evaluating the dynamic calibration result according to the external environment perception module of the terminal device comprises:
   performing temporal noise reduction processing on the continuous image sequence of the dynamic calibration process collected by the camera module to obtain a smoothed dynamic calibration reference image sequence;
   performing optical flow analysis and motion trajectory reconstruction on the smoothed dynamic calibration reference image sequence to obtain a dynamic motion feature mapping;
   performing correlation analysis on the dynamic motion feature mapping and the dynamic calibration parameters of the unified matrix of the sensor coordinate system to obtain a dynamic calibration consistency evaluation result;
   performing multi-scale error decomposition and variance analysis on the dynamic calibration consistency evaluation result to obtain the error distribution characteristics of the dynamic calibration result; and
   constructing a nonlinear correction model of the dynamic calibration parameters based on the error distribution characteristics of the dynamic calibration result to obtain the refined correction values of the dynamic calibration parameters.

5. The method for operating an application program based on somatosensory according to claim 1, wherein performing standardized preprocessing on the original motion data under the unified matrix of the sensor coordinate system to obtain a standardized sensor data stream comprises:
   performing wavelet transform spectrum decomposition on the original motion data under the unified matrix of the sensor coordinate system to obtain multi-scale frequency components;
   constructing a machine learning-based abnormal recognition model for the multi-scale frequency components to detect and mark abnormal data segments and bad channels in the signal to obtain an abnormal signal mapping;
   applying an adaptive interpolation algorithm to the abnormal data segments in the abnormal signal mapping and reconstructing the signal based on the frequency characteristics of the adjacent normal data segments to obtain the corrected frequency components;

performing noise filtering on the corrected frequency components based on a preset multi-order filter bank to obtain noise-reduced processing data;

performing independent component analysis algorithm on the noise-reduced processing data to decompose the multi-dimensional sensor signal into mutually independent functional components to obtain a decoupled signal set; and generating a standardized sensor data stream after noise reduction and reconstruction based on the decoupled signal set.

6. The method for operating an application program based on somatosensory according to claim 1, wherein performing multi-dimensional motion feature extraction on the standardized sensor data stream to obtain a motion feature vector comprises:

performing multi-scale Fourier transform on the standardized sensor data stream to obtain a frequency domain feature representation;

performing time-frequency joint analysis on the frequency domain feature representation to obtain the time-frequency distribution of the motion features;

constructing a feature vector clustering algorithm based on the time-frequency distribution of the motion features to obtain a motion feature atom set;

performing semantic relevance analysis on the motion feature atom set to obtain an action semantic feature mapping; and generating a multi-dimensional motion feature space vector according to the action semantic feature mapping to obtain a motion feature vector.

7. The method for operating an application program based on somatosensory according to claim 1, wherein mapping the motion feature vector to a standard input event mapping to obtain a standard input event sequence comprises:

performing semantic parsing and action intention recognition on the motion feature vector to obtain action intention characteristics;

constructing an action-event mapping rule library based on the action intention characteristics to obtain a mapping conversion model;

performing probabilistic semantic matching on the mapping conversion model to obtain a candidate set of input events for the action semantics;

performing rule filtering and context relevance evaluation on the candidate set of input events to obtain a standardized subset of input events; and generating a standard input event sequence with temporal relevance according to the standardized subset of input events.

8. An equipment for operating an application program based on somatosensory, comprising a memory, a processor, and a somatosensory-based application program operation program stored in the memory and operable on the processor, wherein the processor implements the method for operating an application program based on somatosensory according to claim 1 when executing the somatosensory-based application program operation program.

9. A non-transitory computer-readable storage medium, wherein a somatosensory-based application program operation program is stored thereon, and the somatosensory-based application program operation program, when executed by a processor, implements the method for operating an application program based on somatosensory according to claim 1.

10. A device for operating an application program based on somatosensory, comprising a communication module, configured to establish a communication connection with a smart wearable device and obtain original sensor data of a motion sensor from the smart wearable device;

a calibration module, configured to calibrate a multi-dimensional coordinate system of the motion sensor according to the original sensor data to obtain a unified matrix of the sensor coordinate system after multi-dimensional calibration;

a standardization module, configured to perform standardized preprocessing on the original motion data under the unified matrix of the sensor coordinate system to obtain a standardized sensor data stream;

a feature extraction module, configured to perform multi-dimensional motion feature extraction on the sensor data stream to obtain a motion feature vector;

a mapping module, configured to map the motion feature vector to a standard input event mapping to obtain a standard input event sequence, wherein the standard input event includes a keyboard event and a mouse event;

an interface processing module, configured to perform cross-platform standard interface processing on the standard input event sequence to obtain a standardized input event stream that can be transmitted across platforms; and an operation module, configured to operate the target application program based on the standardized input event data stream.

* * * * *